Jan. 5, 1965   A. D. STANLEY   3,163,930
METHOD OF FABRICATING JOINTS ON ALUMINUM DOORS OR THE LIKE
Filed Sept. 30, 1960   2 Sheets-Sheet 1
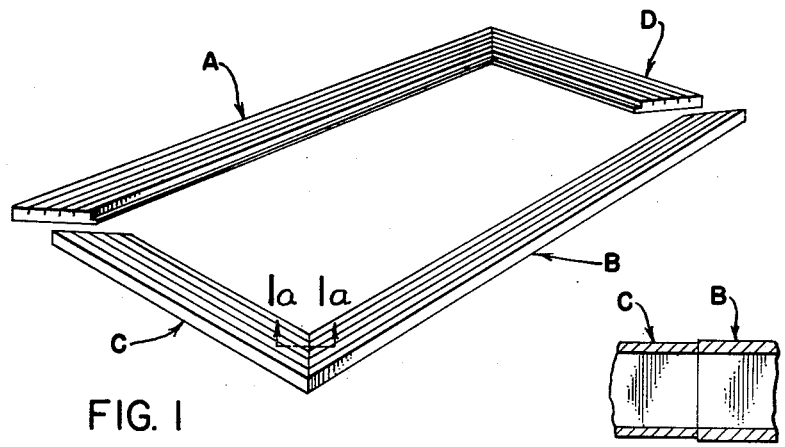
FIG. 1
FIG. 1a
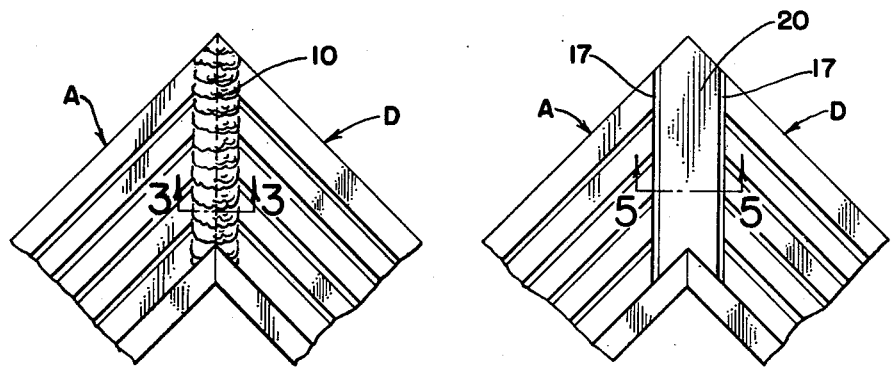
FIG. 2
FIG. 4
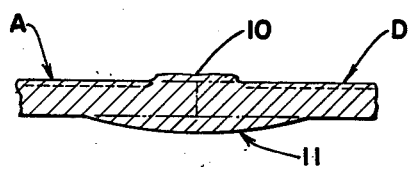
FIG. 3
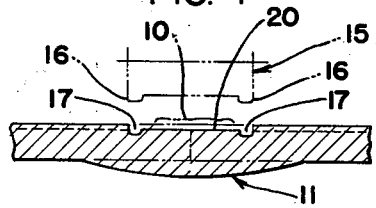
FIG. 5
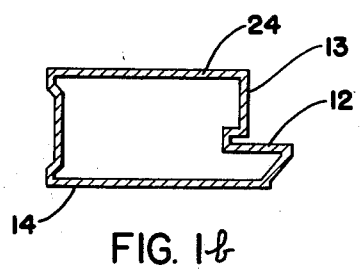
FIG. 1b
*INVENTOR.*
ALTON D. STANLEY
BY Williams, Tilburg and Gobrick
ATTORNEYS

Jan. 5, 1965  A. D. STANLEY  3,163,930
METHOD OF FABRICATING JOINTS ON ALUMINUM DOORS OR THE LIKE
Filed Sept. 30, 1960  2 Sheets-Sheet 2

*INVENTOR.*
ALTON D. STANLEY

ATTORNEYS

United States Patent Office 3,163,930
Patented Jan. 5, 1965

3,163,930
METHOD OF FABRICATING JOINTS ON ALUMINUM DOORS OR THE LIKE
Alton D. Stanley, Albia, Iowa, assignor to The Moloney Company, Albia, Iowa, a corporation of Ohio
Filed Sept. 30, 1960, Ser. No. 59,575
3 Claims. (Cl. 29—471.1)

This invention is concerned with the manufacture of extruded tubular aluminum doors or the like structures and is directed to the formation of welded joints between the tubular stile and rail pieces of the door structure in such manner as not to detract from the mill-bright appearance of the door.

It has become universal commercial practice to manufacture aluminum doors by the use of extruded tubular stile and rail members joined at the door corners by various connection structures, all of which are directed to the obtaining of a sturdy corner structure which will be neat in external appearance. A sturdy corner structure is obtainable by welding abutting mitred ends of the stile and rail tubes, but the cleanup of the joint is fraught with many difficulties, some of which involve the removal of too much metal from the joined ends of the tubes thereby weakening the connection. An extruded tubular stock having a wall thickness of not less than approximately .050", has been found to be satisfactory in strength for doors of varying commercial width. However, the permitted extrusion tolerance or variation of the overall dimensions in the cross section of a tube strip must be generous due to the variable conditions prevailing from time to time during the extruding of a strip which may be from fifty to one hundred feet or more in length. For example, the outside dimensions of the tube may vary as much as .020" in a single strip or from strip to strip. Since these strips are cut into stile and rail lengths and subsequently taken at random for a door, any uniformity of the cross section is lost during the course of door assembly.

The general object of the present invention therefore is the provision of a aluminum welding and finishing process which will afford an economically practical method of welding and finishing tubular aluminum door stiles and rails while maintaining the strength of the weld. Another object of the present invention is the provision of a method of dividing or distributing the amount of variation in the thickness of an abutting stile and rail at the inner and outer external surfaces of the door corner joint.

A further object is the provision of a method of welding the mitred abutment of a tubular door stile and rail in such manner that when the welds are cleaned up the welded thickness of the walls of the tubes will not be less than the extruded thicknesses of the tube welded. A still further object is the provision of a method of welding and surface finishing of the weld which can be effected without decreasing the strength of the welded joint.

A still further object is the fulfillment of the aforegoing objects in a so-called combination door structure wherein the shoulders forming the abutment surfaces for the insert panels will be disposed in a common plane, after the welding steps are completed.

Other objects of the present invention will be apparent to those skilled in the art from the following description setting forth a preferred procedure. The essential characteristics are summarized in the appended claims.

In the drawings FIG. 1 is a diagrammatic perspective of two identical stiles A and B and two identical rails C and D, which though not shown as tubular are identical in tubular section shape;

FIG. 1a is a cross section taken along the line 1a—1a of FIG. 1, when the members A, B, C, and D of FIG. 1 are tubular;

FIG. 1b shows the cross-section of the tubular stock used for the members diagrammatically represented in FIG. 1;

FIG. 2 is an exterior view of one corner weld where the members A–D of FIG. 1 are roughly rectangular tube members after the weld is completed and showing but one of two parallel opposite side welds present at the corner;

FIG. 3 is a cross-section of one of the welds taken along the line 3—3 of FIG. 2;

FIG. 4 illustrates the manner of finishing the corner weld to obtain a mill-bright appearance at the welded corner;

FIG. 5 is a cross-section of one corner weld taken along the line 5—5 in FIG. 4; and FIG. 6 is a cross-sectional view of cooperating jaws of a clamping fixture for clamping the tubular members in abutted relation while distributing any variation in the overall thickness of the tubes forwardly and rearwardly of the frame as shown in FIG. 1a.

Figure 6:
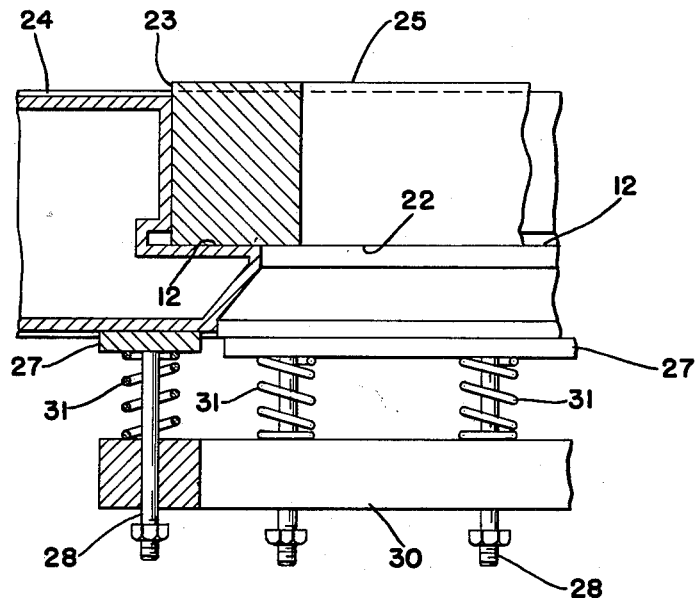

My invention contemplates the production of doors of various heights and widths, which doors comprise essentially two stiles and top and bottom rails, all four of such members being formed of extruded tubular aluminum members having like cross sections. The tubular members when joined form a frame for the insertion and securement of interchangeable glass and screen panels, thus providing a screen door or storm door as desired. Such doors are commercially common but in the present instance it is the purpose to weld the stile ends and rails in such manner that the welded joints may be finished to a mill-bright appearance without weakening the welded joints.

I find that an argon weld can be effected by weld heating the abutting ends of the aluminum tubes being welded without metal discoloration by the use of a welding rod or tape of the same alloy properties as the aluminum alloy comprising the extrusion. By effecting the weld or welds in a vertical direction while welding metal is applied to the outside of the abutting portions of the tubes, those portions tend to sag inwardly of the tube, forming a relatively wide ridge or rib of metal. If desired, both front and back welds may be formed at the same time. It has been found that the welding rod can build up a layer of the metal above the surfaces of the tubes while avoiding the occurrence of heat accumulation in excess of the heat required for the plastic or sagging condition to form the inner ridges or ribs above described.

To obtain convenient vertical path welding, a stile tube A and rail D are cut at the ends to form a mitred corner when abutted, and placed in vertical disposition in a clamping fixture with a jaw arrangement such as is shown in FIG. 6. The weld is then applied by the use of any suitable welding head which will move the welding rod or tape vertically along the abutting ends of the two tubes, there being a welding head at the front and back of the tubes being welded. The welding action is so regulated that the metal at the abutting ends of the tubes sags inwardly to form the bulge or ridge 11 without undue flowing of the metal. The external part of the weld is built up by the welding metal 10 and the plastic condition of the metal at the region of weld is such that the abutting end surfaces of the tubes become merged in the weld.

A second set of stile and rail members are likewise welded and then the two right angled tubular formations provided in each set are brought together as diagrammatically illustrated in FIG. 1 and then likewise welded.

The resultant welded frame is then placed in a fixture exposing front and back welds and the surplus weld metal 10 (See FIG. 5) is removed by milling cutters 15 having flanges 16 which form small grooves 17, thus interrupting continuity of the exposed corner surfaces of the frame. Also it will be noted that these grooves are so spaced to be within the confines of the sagged metal 11 at the joints. Optically the impression is created that the milled flat surfaces 20 are in the planes of the outer surfaces of the tubes. Also the surface delimited between grooves 17, running across the corner and bisecting the right angle, and the termination of any longitudinal ribs or surface grooving of the members in grooves 17 acceptably integrates the corner joint into the frame appearance. Thus the forming of the grooves 17 does not result in a weakening of the tube walls at the joint.

In order to prevent all error of overall tube thickness being concentrated on one side of the abutting tubes, clamping on the external surfaces 12, 24 of the tubes is purposely avoided, the clamping being such as to bring about the abutting relation of the tubes as shown in FIG. 1a (See also FIG. 6) wherein the error or tube variations in tube thickness are shown as being distributed at front and back. This can be brought about by the use of a welding fixture having clamping jaws as outlined in FIG. 6, wherein a right angle clamping member 25 bears upon the shoulder 12 of both the abutting tubular structures. These shoulders 12 of the tubes must be in a common plane of the door structure if the removable panels of the door are to fit properly, and are so established by the surface 22 of jaw member 25; while surfaces 23 of jaw 25 establish the surfaces 13 of abutting stile and rail members, hence the members, at right angles.

Yieldingly mounted independent clamp members 27 bearing on external surfaces 14 of respective adjacent members are supported by rods 28, slidably extending through a base plate 30, with interposed springs 31 of sufficient strength to render the clamping action effective when the jaws are closed. The clamping member 30 may be manually actuated through a lever system, or pneumatically or hydraulically actuated as desired to move the jaw assembly of elements 30 and 27 relative to jaw 25 in clamping action. Since the surfaces of the shoulders 12 are the aligning factors, in the event of tube thickness variation the alignment of the tube ends to be welded will be as shown in FIG. 1a, where the thickness variation is distributed to opposite faces of the tubular structures.

The above described clamping device is given only by way of example of means for obtaining a relative positioning of the members to be welded with center-lines at least approximately lying in a common plane to distribute on opposite faces of the members the effect of any difference in thickness. Also where the lateral extent of the external weld marks to be cleaned up so requires the grooves 17 may fall outside the effective width of the penetration bead 11 within the hollow section.

I claim:

1. In the process of welding the tubular stiles and tubular top and bottom rails of a tubular aluminum door wherein the tubular members are rectangular in cross section and have inner and outer door face parallel planes, the steps of mitering the ends of the tubes to form a forty-five degree joint between the tube ends, juxtaposing a mitered end of a rail tube to a mitered end of a stile tube while positioning the rail and stile with any variation of the thickness of the stile as compared to the rail distributed on front and back of the joint being formed, forming a weld with addition of metal along the mitered juxtaposed edges whereby the welds there formed bulge inwardly and build up outwardly beyond the face planes of the welded members, removing metal and thereby forming a planular surface slightly below the adjoining faces along the outer exposed course of the weld and simultaneously forming spaced apart parallel grooves to bound said planular surface, the grooves being spaced apart a distance not greater than the width of the inward bulge of the weld and as widely as the outer exposed weld area.

2. The art of welding extruded tubular aluminum doors which includes the steps of cutting the ends of pieces of extruded aluminum stock having the cross sectional form of the door stiles and the top and the bottom rails of the ultimate door structure whereby the cut ends when abutted afford a right angled joint between a stile piece and a rail piece, abutting the cut edges, welding the abutting edges of the pieces with application of metal while causing the metal to bulge inwardly and to build up outwardly along the abutment, bounding the edges of the weld thus produced by parallel grooves formed in the metal to lie within the width of the bulged metal and simultaneously removing the surplus of built up welded metal between the grooves.

3. The art of welding generally rectangular extruded aluminum door stiles and rails having relatively thin walls comprising providing an extruded tubular aluminum stock of a cross section having longitudinally extruded parallel outer and inner door surfaces and another parallel external surface formed on the tube intermediate the first two said surfaces, cutting the stock into door stiles and rails to form corners of the door when brought into abutment, abutting a stile and rail while having the third parallel surface of the two abutted pieces clamped in a common plane, maintaining such abutted relationship while welding the abutted edges together with application of metal, removing the external surplus metal of the formed weld thereby to form a plane surface disposed between and slightly below the external surfaces of a welded stile and rail, and simultaneously forming spaced grooves to bound said plane surface as it is being formed.

References Cited in the file of this patent

UNITED STATES PATENTS

| | | |
|---|---|---|
| 1,934,765 | Julien | Nov. 14, 1933 |
| 2,219,595 | Lang | Oct. 29, 1940 |
| 2,671,539 | Kiefer | Mar. 9, 1954 |
| 2,679,305 | Gunthorp | May 25, 1954 |
| 2,766,517 | Ericson | Oct. 16, 1956 |
| 2,794,244 | Uecker | June 4, 1957 |
| 2,835,965 | Armacost | May 27, 1958 |

FOREIGN PATENTS

| | | |
|---|---|---|
| 477,665 | Great Britain | Jan. 4, 1938 |